United States Patent [19]

Kurita et al.

[11] 4,245,725

[45] Jan. 20, 1981

[54] DRUM BRAKE WITH HYDRAULIC TUBE, VIBRATION DAMPENING SUPPORT STRUCTURE

[75] Inventors: Tokio Kurita; Koji Horie, both of Toyota, Japan

[73] Assignee: Toyota Jidosha Kogyo Kabushiki Kaisha, Aichi, Japan

[21] Appl. No.: 40,993

[22] Filed: May 21, 1979

[30] Foreign Application Priority Data

Jan. 31, 1979 [JP] Japan .................. 54-9953[U]

[51] Int. Cl.³ .................. F16D 51/00; F16F 7/00
[52] U.S. Cl. .................. 188/326; 24/257; 188/1 B; 188/363; 248/74 A
[58] Field of Search .............. 188/361, 362, 363, 364, 188/365, 326, 1 B, 366, 367; 138/26; 24/73 SA, 73 AP, 81 C, 81 TH, 256, 257, 255 BS; 248/74 A

[56] References Cited

U.S. PATENT DOCUMENTS

| | | |
|---|---|---|
| 713,888 | 11/1902 | Kellner .................. 24/257 R |
| 1,835,763 | 12/1931 | Dick .................. 188/363 |
| 1,939,584 | 12/1933 | White .................. 188/364 X |
| 2,158,700 | 5/1939 | Hoyt .................. 188/326 X |
| 2,161,855 | 6/1939 | Copell .................. 24/257 |
| 2,997,531 | 8/1961 | Oldham et al. .................. 248/74 A |
| 3,313,009 | 4/1967 | Beckerer .................. 24/257 R |
| 3,494,657 | 2/1970 | Tantlinger et al. . |
| 3,680,818 | 8/1972 | Bujnowski et al. .................. 248/74 A X |

*Primary Examiner*—George E. A. Halvosa
*Attorney, Agent, or Firm*—Armstrong, Nikaido, Marmelstein & Kubovcik

[57] ABSTRACT

A drum brake comprising a backplate. A pair of wheel cylinders and a pair of brake shoes are arranged on the front face of the backplate. The wheel cylinders are interconnected to each other via the brake oil tube. The brake oil tube extends from one of the wheel cylinders towards the other cylinder along the rear face of the backplate and is arranged to be spaced from the rear face of the backplate. A tube supporting member made of elastic non-metallic material is inserted between the central portion of the brake oil tube and the rear face of the backplate.

6 Claims, 7 Drawing Figures

DRUM BRAKE WITH HYDRAULIC TUBE, VIBRATION DAMPENING SUPPORT STRUCTURE

DESCRIPTION OF THE INVENTION

The present invention relates to a brake for use in a vehicle.

In a conventional brake for use in a vehicle, in which a pair of wheel cylinders used for actuating the brake shoes is arranged on the front face of the backplate, one of the wheel cylinders is normally connected to the master cylinder. In addition, both wheel cylinders are interconnected to each other via the brake oil tube made of a metallic material so that the brake oil pressure transferred to one of the wheel cylinders from the master cylinder is transferred to the other wheel cylinder via the brake oil tube. In this brake, the brake oil tube is arranged to be spaced from the rear face of the backplate and extends from one of the cylinders towards the other cylinder along the rear face of the backplate. In addition, the central portion of the brake oil tube is supported on the rear face of the backplate by means of a tube supporting member made of a metallic material. However, in the case wherein the metallic brake oil tube is supported by the metallic tube supporting member, since the vibration of the suspension of the wheel and the vibration produced when the braking operation is carried out are directly transferred to the brake oil tube via the metallic tube supporting member, the brake oil tube is vibrated violently. This results in a problem in that, if the brake is used for a long time, the mechanical strength of the brake oil tube reaches the fatigue limit and, as a result, the brake oil tube is destroyed.

An object of the present invention is to provide a brake capable of preventing the brake oil tube from being destroyed by absorbing the vibration of the brake oil tube.

According to the present invention, there is provided a brake for use in a vehicle, comprising: a backplate having a front face and a rear face; a pair of wheel cylinders spaced from each other and fixed onto the front face of the backplate; a brake oil tube interconnecting the wheel cylinders to each other and having opposed ends fixed onto the rear face of the backplate, the brake oil tube extending from one of the wheel cylinders towards the other cylinder along the rear face of the backplate and being arranged to be spaced from the rear face of the backplate; and a tube supporting member made of an elastic non-metallic material and inserted between the rear face of the backplate and the brake oil tube.

The present invention may be more fully understood from the description of preferred embodiments of the invention set forth below, together with the accompanying drawings.

DESCRIPTION OF PREFERRED EMBODIMENTS

Figure 1:
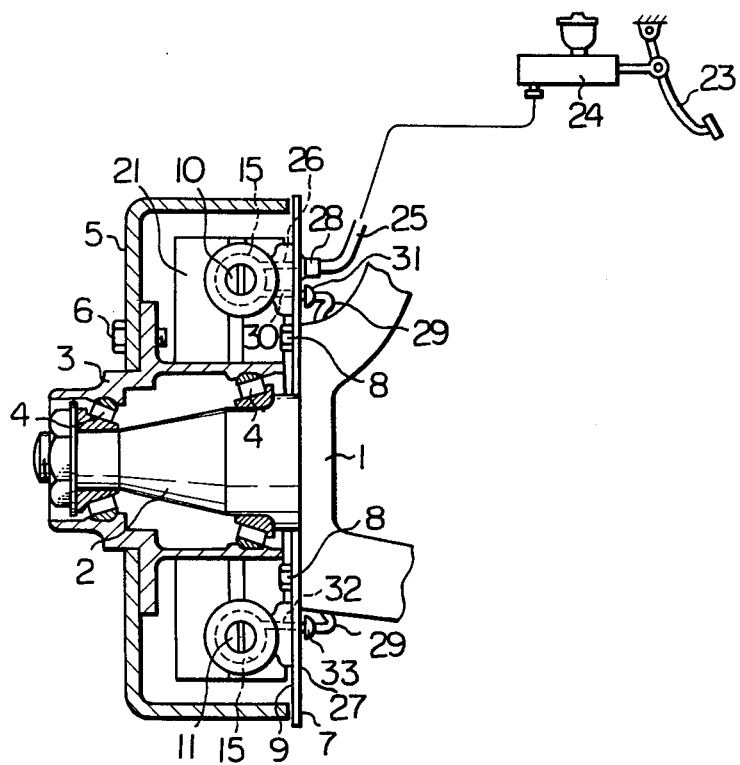
FIG. 1 is a cross-sectional side view of a drum brake used for a front wheel of a vehicle.
Figure 2:
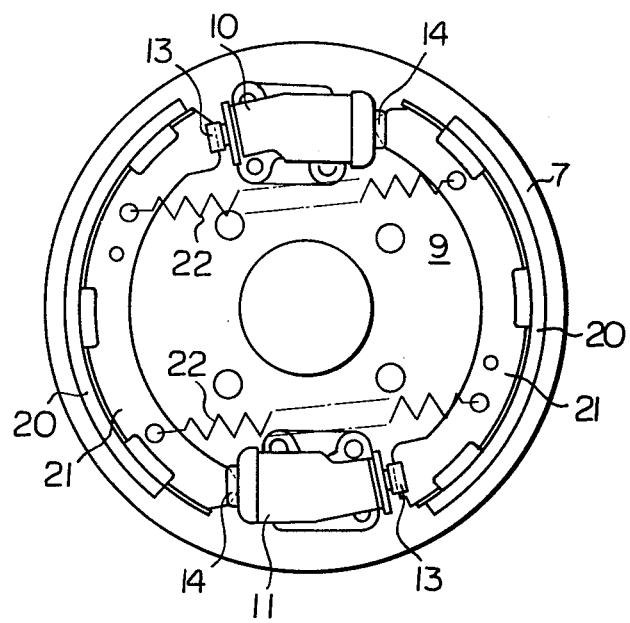
FIG. 2 is a front view of a backplate.
Figure 3:
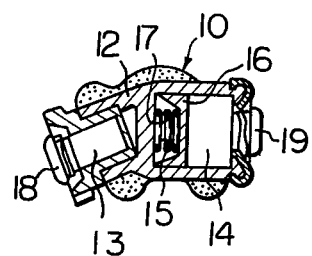
FIG. 3 is a cross-sectional view of a wheel cylinder.

Referring to FIGS. 1 and 2, 1 designates a knuckle 2 an axle, 3 a hub rotatably mounted on the axle 2 via bearings 4; 5 designates a brake drum fixed onto the hub 3 by means of bolts 6; and 7 designates a backplate fixed onto the knuckle 1 by means of bolts 8. A pair of wheel cylinders 10 and 11 is fixed onto the front face 9 of the backplate 7. As is illustrated in FIGS. 2 and 3, each of the wheel cylinders 10 and 11 comprises an anchor bolt 13 fixed onto a cylinder housing 12, and a piston 14 slidably inserted into the cylinder housing 12. This piston 14 is actuated by a change in the oil pressure in a brake oil chamber 15. A sealing member 16 and a compression spring 17 for always biasing the sealing member 16 towards the piston 14 are arranged in the brake oil chamber 15. In addition, slits 18 and 19 are formed on the projecting tips of the anchor bolt 13 and the piston 14, respectively. As is illustrated in FIG. 2, the opposed ends of each of brake shoes 21 equipped with linings 20 are fitted into the slits 18 and 19 19 of the anchor bolt 13 and the piston 14, respectively, and a pair of tension springs 22 is arranged between the brake shoes 21.

Figure 4:
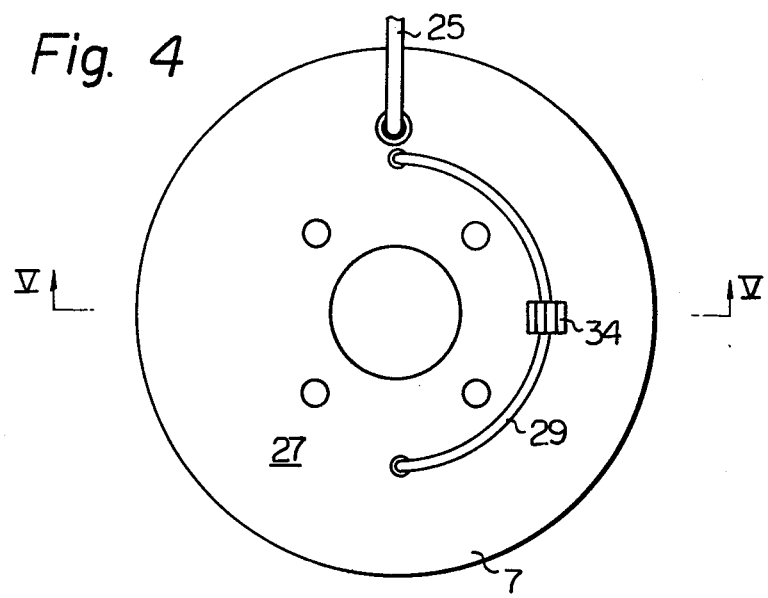
FIG. 4 is a rear view of a backplate.
Figure 5:
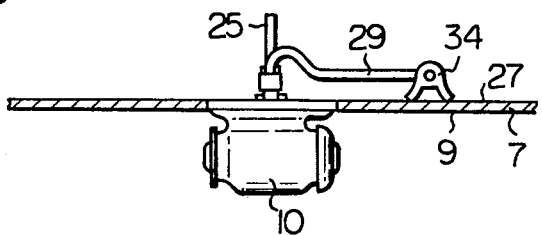
FIG. 5 is a cross-sectional view taken along the line V—V in FIG. 4.

Referring to FIGS. 1, 4 and 5, a flexible brake hose 25 connected to a master cylinder 24 which is actuated by a brake pedal 23 is connected to an oil port 26, which is in communication with the brake oil chamber 15 of the wheel cylinder 10, on the rear face 27 of the back plate 2 by means of a nut 28. In addition, one end of a brake oil tube 29 made of a metallic material is connected to an oil port 30, which is in communication with the brake oil chamber 15 of the wheel cylinder 10, by means of a nut 31. On the other hand, the other end of the brake oil tube 29 is connected to an oil port 32, which is in communication with the brake oil chamber 15 of the wheel cylinder 11, by means of a nut 33. Consequently, the brake oil chamber 15 of the wheel cylinder 10 and the brake oil chamber 15 of the wheel cylinder 11 are interconnected to each other via the brake oil tube 29. Thus, when the brake pedal 23 is depressed, the oil pressure transferred to the brake oil chamber 15 of the wheel cylinder 10 from the master cylinder 24 via the brake hose is transferred to the brake oil chamber 15 of the wheel cylinder 11 via the brake oil tube 19.

As is illustrated in FIG. 5, the brake oil tube 29 is arranged to be spaced from the rear face 27 of the backplate 7 with a constant space over the entire length of the brake oil tube 29.

Figure 6:
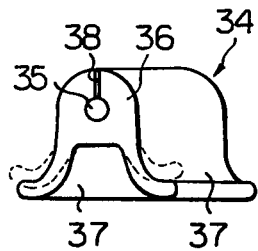
FIG. 6 is a perspective view of an embodiment of a tube supporting member according to the present invention; and,
FIG. 7 is a perspective view of an alternative embodiment according to the present invention.

In addition, as is illustrated in FIG. 4, the brake oil tube 29 is arranged to extend along the periphery of the rear face 27 of the backplate 7 around the knuckle 1 (FIG. 1). As is illustrated in FIGS. 4 and 5, a tube support member 34 made of an elastic non-metallic material such as rubber or sponge rubber is inserted between the central portion of the brake oil tube 29 and the rear face 27 of the backplate 7. As is illustrated in FIG. 6, the tube supporting member 34 comprises a head portion 36 forming a tube supporting hole 35 therein, and a pair of leg portions 37 obliquely extending downwards and outwards so that the distance therebetween is gradually increased. In addition, a slit 38 for the insertion of a tube, which extends from the top of the head portion 36 into the tube supporting hole 35 is formed in the head portion 36. The tube supporting member 34 is assembled onto the backplate 7 is such a way that, after the brake oil tube 29 is secured onto the back plate 7, the brake oil tube 29 is inserted into the tube supporting hole 35 of the tube supporting member 34 so that the leg portions 37 of the tube supporting member 34 abuts against the rear face 27 of the backplate 7. When the tube supporting member 34 is assembled onto the brake oil tube 29, the leg portions 37 of the tube supporting member 34 are bent due to the resiliency of the brake oil tube 29 as illustrated by the broken lines in FIG. 6; thus, the tube supporting member 34 resiliently abuts against the rear face 27 of the backplate 7. Consequently, even if the backplate 7 is vibrated when a vehicle is driven, the vibration transferred to the brake oil tube 29 from the backplate 7 is absorbed by the tube supporting member 34; thus, the life of the brake oil tube 29 is prolonged.

Figure 7:
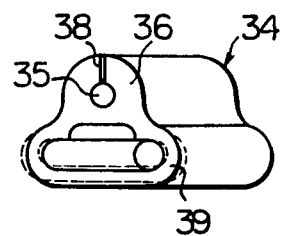

FIG. 7 illustrates an alternative embodiment of a tube supporting member according to the present invention. In this embodiment, a leg portion 39 having a hollow tubular shape is formed on the bottom of the head portion 36. When the tube supporting member 34 is assembled onto the brake oil tube 29, the leg portion 39 of the tube supporting member 34 is deformed as illustrated by the broken lines in FIG. 7, and the tube supporting member 34 thus abuts resiliently against the rear face 27 of the backplate 7.

According to the present invention, the life of the brake oil tube can be considerably prolonged. In addition, in the present invention, since the tube supporting member can be assembled onto the brake oil tube by merely inserting the tube supporting member between the backplate and the brake oil tube, such an assembling operation of the tube supporting member becomes easy as compared with the case where the brake oil tube is supported by the tube supporting member made of a metallic material as in the conventional brake.

While the invention has been described with reference to specific embodiments chosen for purposes of illustration, it should be apparent that numerous modifications could be made thereto by those skilled in the art without departing from the spirit and scope of the invention.

What is claimed is:

1. A brake for use in a vehicle, comprising:
   a backplate having a front face and a rear face;
   a pair of wheel cylinders spaced from each other and fixed onto the front face of said backplate;
   a brake oil tube interconnecting said wheel cylinders to each other and having opposed ends fixed onto the rear face of said backplate, said brake oil tube extending from one of said wheel cylinders towards the other cylinder along the rear face of said backplate and being arranged to be spaced from the rear face of said backplate; and
   a tube supporting means, made of an elastic nonmetallic material deformably inserted between the rear face of said backplate and said brake oil tube, for supporting said brake oil tube and for absorbing vibrations of said backplate, said tube supporting means comprising a head portion having a hole therein, wherein said brake oil tube is positioned in said hole, and leg means non-fixedly contacting the rear face of said backplate wherein when said leg means contacts the rear face of said backplate, said leg means are deformed.

2. A brake as claimed in claim 1, wherein said head portion has a slit extending from the top of said head portion into the hole of said head portion.

3. A brake as claimed in claim 1, wherein said leg means comprises a pair of legs each extending obliquely outwardly towards the rear face of said backplate from the bottom of said head portion.

4. A brake as claimed in claim 1, wherein said leg means has a hollow tubular shape.

5. A brake as claimed in claim 1, wherein said tube supporting means is made of rubber.

6. A brake as claimed in claim 5, wherein said tube supporting means is made of sponge rubber.

* * * * *